F. R. PACKHAM.
SEEDING MACHINE.
APPLICATION FILED JAN. 29, 1912.
1,029,712.
Patented June 18, 1912.
2 SHEETS—SHEET 1.
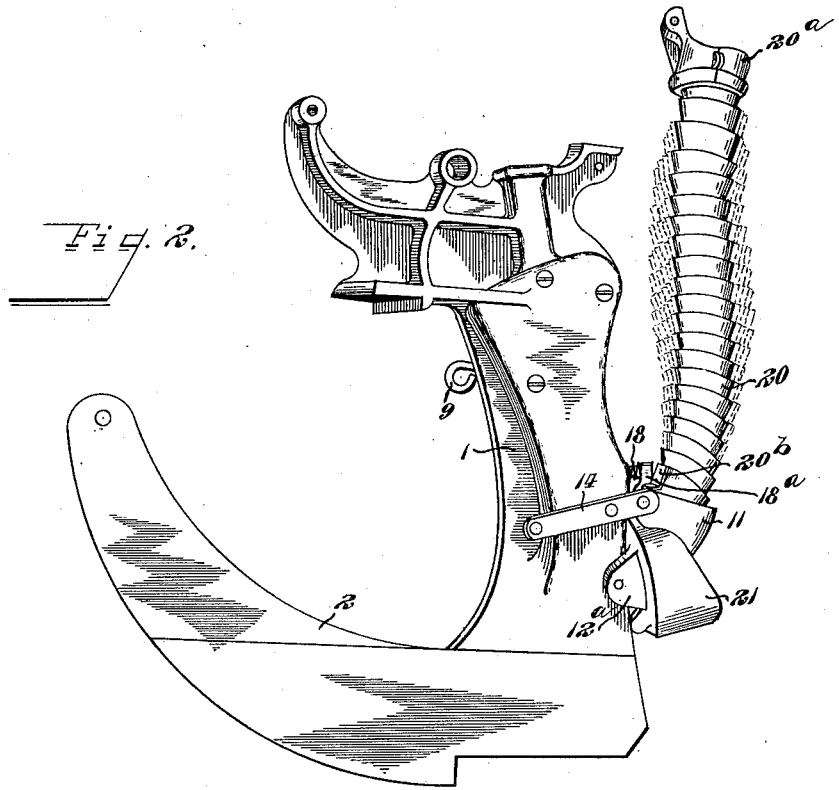
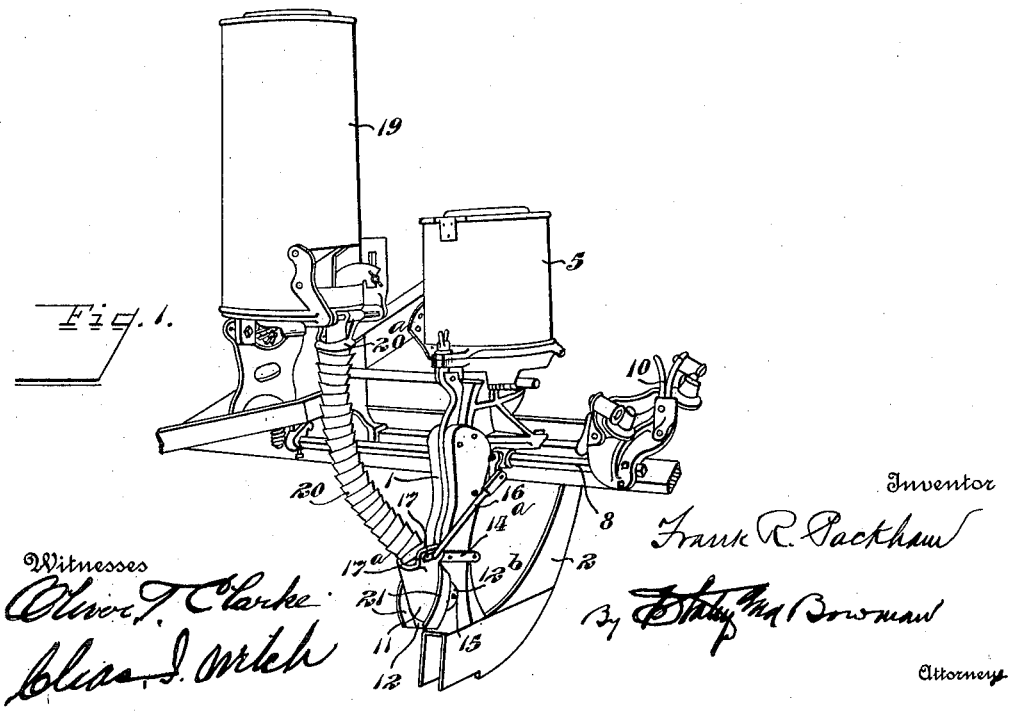

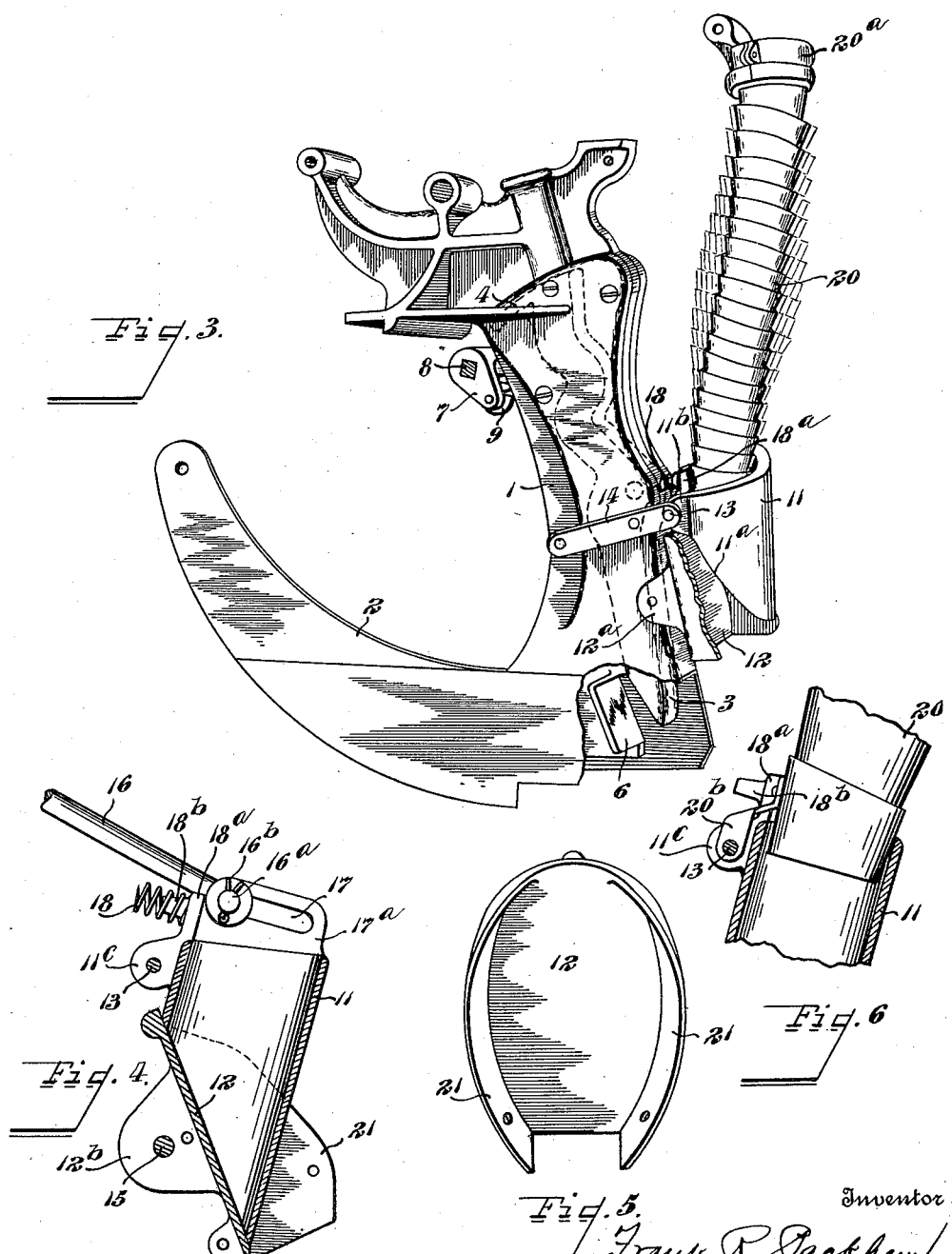

UNITED STATES PATENT OFFICE.

FRANK R. PACKHAM, OF SPRINGFIELD, OHIO, ASSIGNOR TO THE AMERICAN SEEDING MACHINE COMPANY, OF SPRINGFIELD, OHIO, A CORPORATION OF OHIO.

SEEDING-MACHINE.

1,029,712.   Specification of Letters Patent.   Patented June 18, 1912.

Application filed January 29, 1912. Serial No. 674,106.

*To all whom it may concern:*

Be it known that I, FRANK R. PACKHAM, a citizen of the United States, residing at Springfield, in the county of Clark and State of Ohio, have invented certain new and useful Improvements in Seeding-Machines, of which the following is a specification.

My invention relates to improvements in seeding machines, and especially to machines for planting corn and other seed of that character, wherein the seed is deposited in hills; it more particularly relating to a fertilizer attachment by which a quantity of fertilizer may be deposited with each hill of seed.

An object of my invention is to provide a fertilizer attachment which will be simple in construction and effective in operation. The particular object is to provide a valve which will have a self-adjusting valve seat, so that the valve will properly seat itself; also to provide for imparting to the flexible fertilizer tube or spout a vibratory movement upon each operation of the valve, to prevent sticking or clogging of the fertilizing material therein; and also to provide for protecting the falling fertilizer material against wind or air currents and also for guiding it after being discharged from the valve, to cause it to be properly deposited in the furrow.

In the accompanying drawings:—Figure 1 is a perspective view of a portion of a corn planter to which my improvements are shown applied. Fig. 2 is a perspective view of one of the runners and its post, with the fertilizer attachment connected therewith. Fig. 3 is a view similar to Fig. 2 showing some of the parts broken away, and also showing the seed tube partly in dotted lines and its connection with the rock-shaft. Fig. 4 is a vertical section of the fertilizer valve and valve seat. Fig. 5 is a detail of the valve seat. Fig. 6 is a detail view showing a portion of the fertilizer valve in section and also a portion of the fertilizer tube, showing the manner of securing the tube in position.

Like parts are represented by similar characters of reference in the several views.

In the said drawings, 1 represents the ordinary runner post of the corn planter, carrying at its lower end the usual runner 2 and having located therein the valve mechanism for the seed; this mechanism in the present case being in the nature of a tube 3 of peculiar construction, as shown partly in dotted and partly in full lines in Fig. 3, the upper end of which is provided with a valve lip 4, which in the initial position of the tube, receives the falling hill of seed from the seed dropping devices located in the seed hopper 5, said tube having an inclined or beveled lower end adapted to seat against an inclined valve seat 6. This tube is connected with a crank 7 on the usual rock-shaft 8, through the medium of the link 9, which rock-shaft is operated in the usual way from the check-row devices 10, so as to oscillate the tube to cause it to deposit the seed in hills, in the manner more fully described in my pending application Ser. No. 672,469, filed January 20th, 1912.

Pivotally connected at the rear of the runner post 1 is a valve 11, and a valve seat 12. The valve 11 is in the nature of a short tube with its lower end beveled or inclined on the forward side, as indicated at $11^a$ so as to give said valve somewhat the shape of the mouthpiece of a whistle. The upper forward end of this valve is provided with ears $11^b$ and $11^c$, which receive the pin 13 which pivotally connects said valve with the rear end of straps 14 and $14^a$, which embrace and are secured to the post 1. The forward side of the valve seat 12 is provided, midway its length, with ears $12^a$ and $12^b$, through which loosely extends the pin 15 secured in the rear wall of the post 1, so that said valve seat 12 will be capable of a rocking motion, which, when the beveled or inclined portion of the valve 11 closes against the same, will enable the parts to aline themselves with respect to each other and thus insure a tight and accurate closing of the valve.

The valve 11 is operatively connected to the rock-shaft 8, previously referred to, by a pivoted link 16, the rear bent end $16^a$ of which extends into a slotted opening 17 of an ear $17^a$ projecting from the upper end of said valve 11, and is secured from displacement by a cotter pin $16^b$; the slotted opening construction being for the purpose of permitting the operation of the seed valve mechanism independent of the fertilizer valve under certain conditions, such as clogging of the fertilizer valve, for instance, which would prevent full movement of the seed valve, and also for permitting the drilling of the fertilizer, and is a feature which does not enter into the present improvements. The valve 11 is held normally closed against the seat 12 by a spring 18 interposed between the rear wall of the post 1 and the lug 18ª, projecting from the forward side of the upper end of the valve and having a small projection 18ᵇ extending into the coils of the spring to prevent displacement thereof.

The valve 11 is connected with the fertilizer hopper 19 by a tube 20 of a flexible nature, of that type known as steel ribbon tubes constructed in the nature of telescopic whirls. The upper end of this tube is connected with the discharge spout of the fertilizer hopper 19 through the medium of a head 20ª, secured to the hopper, and the lower end of the tube is also fastened securely within the tube-shaped valve 11 so that each time the valve opens and closes, the tube will be compressed and expanded so as to give it a vibratory movement which effectually prevents the fertilizer material from sticking or clogging on the inside of the tube regardless of the inclination at which the tube may be placed; the manner of connecting the tube to the valve being preferably through the medium of a strap 20ᵇ, riveted to one of the lower whirls of the tube, then bent forwardly and thence downwardly and provided with an eye through which extends the pivot pin 13 as shown in detail in Fig. 6.

Extending rearwardly from each side of the valve seat 12 is a wing 21, between which wings the valve seats itself. From Fig. 5, it will be seen, that these wings 21 are curved so as to conform to the contour of the valve and are also converged more or less at their lower ends. Owing to the peculiar construction of the valve 11, it will be understood that when the same opens, the fertilizer material, falling therefrom, would be unconfined at the sides, so far as the valve itself is concerned, and it is the purpose of these wings 21 to form in effect a converging conduit or chute to receive the fertilizer material as it falls from the valve; this construction not only protecting the material from the wind and strong air currents, but also serving to confine the material to narrow limits and preventing it from spreading outside the confines of the walls of the trench.

While I have shown and described these devices as particularly applicable for the purpose of distributing fertilizer, yet it is obvious that they may also be adapted for sowing seed, particularly the self-alining valve feature.

Having thus described my invention, I claim:

1. In a seeding machine, a support, a valve pivoted to said support, and a valve seat also pivoted to said support independently of said valve, the pivotal point of said valve seat being between its ends whereby it will be caused to aline itself with said valve.

2. In a seeding machine, a distributer comprising a pivoted valve, together with means for opening and closing the same, in combination with a valve seat pivoted between its ends independently of said valve to permit the same to aline itself with said valve.

3. In a seeding machine, a distributer comprising a pivoted tubular-shaped valve having an inclined face, together with means for opening and closing the same, and a valve seat coöperating with said valve, said valve seat being pivoted independently of said valve so as to cause the same to aline itself with the inclined face of said valve.

4. In a seeding machine, a distributer comprising a pivoted tubular-shaped valve having an inclined face, together with means for opening and closing the same, and a valve seat coöperating with said valve, said valve seat being pivoted between its ends independently of said valve to cause the same to aline itself with the inclined face of said valve.

5. In a seeding machine, an attachment comprising a pivoted valve, and a self-alining valve seat pivoted independently of said valve, a spring for normally holding said valve against said valve seat, and means for opening said valve.

6. In a seeding machine, seed dropping devices, and a fertilizer distributing device, said fertilizer distributing device comprising a pivoted valve, a self-alining valve seat pivoted independently of said valve, and means for opening and closing said fertilizer valve simultaneously with the operation of the seed dropping devices.

7. In a distributer, a hopper, a valve together with means for opening and closing said valve, a flexible tube connecting said hopper and valve, and means for vibrating said tube upon the opening and closing of said valve.

8. In a distributer, a hopper, a movable valve, and a flexible tube extending from said hopper to said valve, said tube having a connection with said valve such that when said valve is opened and closed the tube will be vibrated.

9. In a distributer, a hopper, a movable valve, and a flexible tube extending from said hopper to said valve, said flexible tube being formed of a series of telescopic flexible whirls, the connection between said tube and valve being such that upon each opening and closing movement of said valve the whirls of said tube will be contracted and expanded to cause said tube to be vibrated.

10. In a distributer, a pivoted hollow valve adapted to discharge downwardly, a downwardly extending valve seat for said valve pivoted independently of said valve, and a chute on said valve seat, substantially as and for the purpose specified.

11. In a distributer, a pivoted hollow valve having an inclined face, a seat for said valve pivoted independently of said valve, and a chute on said seat, substantially as and for the purpose specified.

12. In a fertilizer distributer, a hollow valve having an inclined face, said valve being adapted to discharge downwardly, a downwardly-extending seat for the inclined face of said valve, wings on said seat inclosing said valve, said wings being converged to form a converging chute, substantially as and for the purpose specified.

13. In a fertilizer distributer, a pivoted tubular-shaped valve having an inclined face, a self-alining valve seat for the inclined face of said valve, shields on said valve seat adapted to inclose said valve, said shields being shaped to form a converging chute, substantially as and for the purpose specified.

In testimony whereof, I have hereunto set my hand this 27th day of January, 1912.

FRANK R. PACKHAM.

Witnesses:
MAXMILLA PACKHAM,
CHAS. I. WELCH.

---

Copies of this patent may be obtained for five cents each, by addressing the "Commissioner of Patents, Washington, D. C."